(12) United States Patent
Pu et al.

(10) Patent No.: US 10,769,476 B2
(45) Date of Patent: Sep. 8, 2020

(54) LICENSE PLATE DETECTION METHOD AND DEVICE

(71) Applicant: Hangzhou Hikvision Digital Technology Co., Ltd., Zhejiang (CN)

(72) Inventors: Shiliang Pu, Zhejiang (CN); Yi Niu, Zhejiang (CN); Zuozhou Pan, Zhejiang (CN); Binghua Luo, Zhejiang (CN)

(73) Assignee: Hangzhou Hikvision Digital Technology Co., Ltd. (CN)

( * ) Notice: Subject to any disclaimer, the term of this patent is extended or adjusted under 35 U.S.C. 154(b) by 74 days.

(21) Appl. No.: 16/086,789

(22) PCT Filed: Mar. 8, 2017

(86) PCT No.: PCT/CN2017/075941
§ 371 (c)(1),
(2) Date: Sep. 20, 2018

(87) PCT Pub. No.: WO2017/162023
PCT Pub. Date: Sep. 28, 2017

(65) Prior Publication Data
US 2019/0073551 A1    Mar. 7, 2019

(30) Foreign Application Priority Data
Mar. 21, 2016   (CN) .......................... 2016 1 0160790

(51) Int. Cl.
*G06K 9/32*    (2006.01)
*G06K 9/62*    (2006.01)
(Continued)

(52) U.S. Cl.
CPC .......... *G06K 9/325* (2013.01); *G06K 9/00624* (2013.01); *G06K 9/3258* (2013.01);
(Continued)

(58) Field of Classification Search
CPC .......... G06K 9/325; G06K 9/627; G06K 9/48; G06K 9/4628; G06K 9/50; G06K 9/3258;
(Continued)

(56) References Cited

U.S. PATENT DOCUMENTS 4,878,248 A    10/1989  Shyu et al.
9,760,789 B2 *  9/2017  Burry .................. G06K 9/3258
(Continued)

FOREIGN PATENT DOCUMENTS

| CN | 101183425 A | 5/2008 |
|----|-------------|--------|
| CN | 102375982 A | 3/2012 |

(Continued)

OTHER PUBLICATIONS

Robust Chinese Traffic Sign Detection and Recognition with Deep Convolutional Neural Network; Qian et al; 2015 11th International Conference on Natural Computation (ICNC); 6 pages.
(Continued)

*Primary Examiner* — Brandon J Miller
(74) *Attorney, Agent, or Firm* — Mark E. Bandy; Rankin, Hill & Clark LLP

(57) ABSTRACT

Embodiments of the present disclosure provide a method and apparatus for detecting a license plate. The method comprises: obtaining, according to pixel values of pixels in an image to be detected, a candidate license plate area $M_1$ in the image to be detected (S101); calculating an aspect ratio of the candidate license plate area $M_1$ and determining if the aspect ratio is greater than a first predefined threshold (S102); determining, if the aspect ratio is greater than the first predefined threshold, a new candidate license plate area $M_2$ from the candidate license plate area $M_1$ according to a predefined machine learning-based regression algorithm (S103); determining, according to a first predefined classification model, whether the candidate license plate area $M_2$
(Continued)

is a license plate area (S104); determining, if the candidate license plate area $M_2$ is a license plate area, the candidate license plate area $M_2$ as a license plate area, and generating a detection result based on the candidate license plate area $M_2$ (S105). The application of the solution improves the accuracy of license plate detection.

12 Claims, 7 Drawing Sheets

(51) Int. Cl.
  *G06K 9/48* (2006.01)
  *G06K 9/46* (2006.01)
  *G06K 9/50* (2006.01)
  *G06K 9/00* (2006.01)
(52) U.S. Cl.
  CPC ............ *G06K 9/4628* (2013.01); *G06K 9/48* (2013.01); *G06K 9/50* (2013.01); *G06K 9/627* (2013.01); *G06K 9/6259* (2013.01); *G06K 2209/15* (2013.01)
(58) Field of Classification Search
  CPC ............ G06K 9/00624; G06K 9/6259; G06K 2209/15; G06K 9/4661; G06K 9/4604
  See application file for complete search history.

(56) References Cited

U.S. PATENT DOCUMENTS

| | | | | |
|---|---|---|---|---|
| 10,311,731 | B1* | 6/2019 | Li | ............................ G08G 1/142 |
| 2011/0135156 | A1* | 6/2011 | Chen | ........................ G06K 9/325 |
| | | | | 382/105 |
| 2012/0106802 | A1* | 5/2012 | Hsieh | .................... G06K 9/3258 |
| | | | | 382/105 |
| 2014/0169633 | A1* | 6/2014 | Seyfried | ............ G06K 9/00791 |
| | | | | 382/105 |
| 2014/0187223 | A1 | 7/2014 | Ivanchenko et al. | |
| 2014/0218533 | A1 | 8/2014 | Nerayoff et al. | |
| 2015/0294175 | A1* | 10/2015 | Bala | ......................... G06T 7/73 |
| | | | | 382/105 |
| 2016/0232410 | A1 | 8/2016 | Kelly et al. | |
| 2017/0262723 | A1* | 9/2017 | Kozitsky | ............... G06K 9/6267 |
| 2017/0300786 | A1* | 10/2017 | Gope | ................. G06K 9/00791 |

FOREIGN PATENT DOCUMENTS

| | | |
|---|---|---|
| CN | 102999753 | 3/2013 |
| CN | 103049742 A | 4/2013 |
| CN | 103870803 | 6/2014 |
| CN | 105205489 A | 12/2015 |
| CN | 105354570 | 2/2016 |

OTHER PUBLICATIONS

Rich feature hierarchies for accurate object detection and semantic segmentation supplementary material; Girshick et al; 8 pages.
Rich feature hierarchies for accurate object detection and semantic segmentation; cvpr2014; Girshick et al; 8 pages.
CN Office Action dated Apr. 29, 2019; App. No. 201610160790.9; 9 pages.
Extended European Search Report dated Mar. 18, 2019; App. No. 17769300.9; 11 pages.

* cited by examiner

LICENSE PLATE DETECTION METHOD AND DEVICE

RELATED APPLICATION

The present disclosure claims priority to the Chinese patent application No. 201610160790.9, filed with the China. Intellectual Property Administration on Mar. 21, 2016 and entitled "LICENSE PLATE DETECTION METHOD AND DEVICE", which is incorporated herein by reference in its entirety.

TECHNICAL FIELD

The present disclosure relates to the field of intelligent transportation, and in particular to a method and apparatus for detecting a license plate.

BACKGROUND

With the developments of the intelligent transportation technology, the application of license plate detection technology has expanded from original scenes (such as tolls and security checkpoints) having a substantially unchanging background to universal surveillance scenes such as E-polices and doorways. However, such a scene may provide an ever-changing background for a traffic monitoring image obtained therefrom. In such an image, complicated textures and noises may also be present in vicinity of a license plate area. In addition, a strong resemblance between the texture of a non-license plate area (e.g., window, lamp, and radiator of grille of a vehicle, leaves, grass, fences, and road markings) in the image and that of a license plate would lead to a greatly increased error rate in the identification of the license plate area. Meanwhile, a real license plate area may include a part of the background; as a result, the identification of the boundary between the license plate and a part of the background may have a reduced accuracy. Therefore, an improper result and low accuracy of license plate detection may tend to arise from this.

SUMMARY

Embodiments of the present disclosure disclose a method and apparatus for detecting a license plate, in order to improve the accuracy of license plate detection.

For this purpose, embodiments of the present disclose a method for detecting a license plate, including:

obtaining, according to pixel values of pixels in an image to be detected, a candidate license plate area $M_1$ in the image to be detected;

calculating an aspect ratio of the candidate license plate area $M_1$ and determining whether the aspect ratio is greater than a first predefined threshold;

if the aspect ratio is greater than the first predefined threshold, determining a new candidate license plate area $M_2$ from the candidate license plate area $M_1$ according to a predefined machine learning-based regression algorithm, wherein the candidate license plate area $M_2$ is an area whose aspect ratio is no greater than the first predefined threshold;

determining, according to a first predefined classification model, whether the candidate license plate area $M_2$ is a license plate area, wherein the first predefined classification model is a classification model obtained by learning sample license plate areas through a machine learning algorithm;

if the candidate license plate area $M_2$ is a license plate area, determining the candidate license plate area $M_2$ as a license plate area, and generating a detection result based on the candidate license plate area $M_2$.

Optionally, obtaining, according to pixel values of pixels in an image to be detected, a candidate license plate area $M_1$ in the image to be detected includes:

obtaining a valid pixel segment in each pixel row of the image to be detected in a predefined scan order, wherein, the valid pixel segment is a pixel segment that is determined according to pixels having a greyscale jump value greater than a second predefined threshold in a pixel row;

calculating a boundary similarity for vertically adjacent valid pixel segments, according to pixel values of pixels at both ends of each valid pixel segment and pixel values of pixels at both ends of another valid pixel segment vertically adjacent to that valid pixel segment;

merging adjacent valid pixel segments which have a boundary similarity greater than a third predefined threshold; and obtaining the candidate license plate area $M_1$ in the image to be detected according to the merged valid pixel segments.

Optionally, obtaining a valid pixel segment in each pixel row of the image to be detected in a predefined scan order includes:

obtaining a valid pixel segment in each pixel row of the image to be detected in a predefined scan order by:

calculating a greyscale jump value of each pixel in a pixel row X, wherein the pixel row X is any pixel row in the image to be detected;

selecting pixels having a greyscale value greater than the second predefined threshold;

obtaining a candidate pixel segment in the pixel row X according to a pixel having a maximum horizonal coordinate and a pixel having a minimum horizon coordinate among the selected pixels;

determining whether greyscale jump values of pixels in the candidate pixel segment conform to a predefined greyscale jumping rule; and if so, determining the candidate pixel segment as a valid pixel segment.

Optionally, obtaining the candidate license plate area $M_1$ in the image to be detected according to the merged valid pixel segments includes:

determining a suspected character string area in the merged valid pixel segments;

obtaining color information of character string according to a pixel value of a pixel in the suspected character string area, and obtaining color information of background according to a pixel value of a pixel not in the non-suspected character string area in the merged valid pixel segments;

determining boundary of the candidate license plate $M_1$ according to the color information of character string and the color information of background; and obtaining the candidate license plate area $M_1$ according to the determined boundary.

Optionally, determining a new candidate license plate area $M_2$ from the candidate license plate area $M_1$ according to a predefined machine learning-based regression algorithm includes:

determining a position of a suspected character string in the candidate license plate area $M_1$;

determining, through the predefined machine learning-based regression algorithm, a new boundary of the candidate license plate area according to the determined position; and obtaining the candidate license plate area $M_2$ according to the new boundary.

Optionally, the first predefined classification model is obtained by:

obtaining a sample license plate area having a boundary accuracy greater than a predefined accuracy threshold and/or a sample license plate area having an aspect ratio less than the first predefined threshold, and taking the obtained sample license plate area as a positive sample; and obtaining the first predefined classification model according to the predefined machine learning algorithm and the positive sample.

Optionally, before obtaining the first predefined classification model according to the predefined machine learning algorithm and the positive sample, the method further includes:

obtaining a sample area that is a non-license plate area;

classifying the obtained sample area according to content of the obtained sample area to obtain negative samples of multiple categories;

wherein, obtaining the first predefined classification model according to the predefined machine learning algorithm and the positive sample includes:

obtaining the first predefined classification model according to the predefined machine learning algorithm, the positive sample, and the negative samples of multiple categories.

Optionally, the method the method further includes:

determining, in response to a determination that the candidate license plate area $M_2$ is not a license plate area, whether brightness of the candidate license plate area $M_2$ is within a predefined range of brightness;

performing, if the brightness of the license plate candidate area $M_2$ is not within a predefined range of brightness, grey equalization on the candidate license plate area $M_2$;

determining whether the grey-equalized candidate license plate area $M_2$ is a license plate area according to a second predefined classification model, wherein, the second predefined classification model is a classification model obtained by learning grey-equalized sample license plate areas through a machine learning algorithm;

performing, if the candidate license plate area $M_2$ is a license plate area, the steps of determining the candidate license plate area $M_2$ as a license plate area and generating a detection result based on the candidate license plate area $M_2$.

For the above purpose, embodiments of the present application also discloses an apparatus for detecting a license plate, including a candidate area obtaining module, an aspect ratio determining module, a candidate area determining module, a first license plate area determining module and a detection result generating module; wherein, the candidate area obtaining module is configured for obtaining, according to pixel values of pixels in an image to be detected, a candidate license plate area $M_1$ in the image to be detected;

the aspect ratio determining module is configured for calculating an aspect ratio of the candidate license plate area $M_1$ and determining whether the aspect ratio is greater than a first predefined threshold, and activating the candidate area determining module if the aspect ratio is greater than the first predefined threshold;

the candidate area determining module is configured for determining a new candidate license plate area $M_2$ from the candidate license plate area $M_1$ according to a predefined machine learning-based regression algorithm, wherein the candidate license plate area $M_2$ is an area whose aspect ratio is no greater than the first predefined threshold;

the first license plate area determining module is configured for determining, according to a first predefined classification model, whether the candidate license plate area $M_2$ is a license plate area, wherein, the first predefined classification model is a classification model obtained by learning sample license plate areas through a machine learning algorithm; and activating the detection result generating module if the candidate license plate area $M_2$ is a license plate area; and the detection result generating module is configured for determining the candidate license plate area $M_2$ as a license plate area, and generating a detection result based on the candidate license plate area $M_2$.

Optionally, the candidate area obtaining module includes: a valid pixel segment obtaining submodule, a similarity calculating submodule, a pixel segment merging submodule and a candidate area obtaining submodule; wherein, the valid pixel segment obtaining submodule is configured for obtaining a valid pixel segment in each pixel row of the image to be detected in a predefined scan order, wherein, the valid pixel segment is a pixel segment that is determined according to pixels having a greyscale jump value greater than a second predefined threshold in a pixel row;

the similarity calculating submodule is configured for calculating a boundary similarity for vertically adjacent valid pixel segments, according to pixel values of pixels at both ends of each valid pixel segment and pixel values of pixels at both ends of another valid pixel segment vertically adjacent to that valid pixel segment;

the pixel segment merging submodule is configured for merging adjacent valid pixel segments which have a boundary similarity greater than a third predefined threshold; and the candidate area obtaining submodule is configured for obtaining the candidate license plate area $M_1$ in the image to be detected according to the merged valid pixel segments.

Optionally, the valid pixel segment obtaining submodule is configured for:

obtaining a valid pixel segment in each pixel row of the image to be detected in a predefined scan order;

the valid pixel segment obtaining submodule comprises: a greyscale jump value calculating unit, a pixel selecting unit, a candidate pixel segment obtaining unit, a greyscale jump determining unit and a Valid pixel segment determining unit; wherein, the greyscale jump value calculating unit is configured for calculating a greyscale jump value of each pixel in a pixel row X, wherein the pixel row X is any pixel row in the image to be detected;

the pixel selecting unit is configured for selecting pixels having a greyscale value greater than the second predefined threshold;

the candidate pixel segment obtaining unit is configured for obtaining a candidate pixel segment in the pixel row X according to a pixel having a maximum horizonal coordinate and a pixel having a minimum horizon coordinate among the selected pixels;

the greyscale jump determining unit is configured for determining whether greyscale jump values of pixels in the candidate pixel segment conform to a predefined greyscale jumping rule, and if so, activating the valid pixel segment determining unit;

the valid pixel segment determining unit is configured for determining the candidate pixel segment as a valid pixel segment.

Optionally, the candidate area obtaining submodule includes: a suspected character string area determining unit, a color information obtaining unit, a boundary determining unit and a candidate area obtaining unit; wherein, the suspected character string area determining unit is configured for determining a suspected character string area in the merged valid pixel segments;

the color information obtaining unit is configured for obtaining color information of character string according to a pixel value of a pixel in the suspected character string area, and obtaining color information of background according to a pixel value of a pixel not in the non-suspected character string area in the merged valid pixel segments;

the boundary determining unit is configured for determining boundary of the candidate license plate $M_1$ according to the color information of character string and the color information of background; and the candidate area obtaining unit is configured for obtaining the candidate license plate area $M_1$ according to the determined boundary.

Optionally, the candidate area determining module includes: a position determining submodule, a boundary determining submodule and a candidate area determining submodule; wherein, the position determining submodule is configured for determining a position of a suspected character string in the candidate license plate area $M_1$;

the boundary determining submodule is configured for determining, through the predefined machine learning-based regression algorithm, a new boundary of the candidate license plate area according to the determined position; and the candidate area determining submodule is configured for obtaining the candidate license plate area $M_2$ according to the new boundary.

Optionally, the apparatus further includes a first sample area obtaining module and a classification model obtaining module; wherein, the first sample area obtaining module is configured for obtaining a sample license plate area having a boundary accuracy greater than a predefined accuracy threshold and/or a sample license plate area having an aspect ratio less than the first predefined threshold, and taking the obtained sample license plate area as a positive sample; and the classification model obtaining module is configured for obtaining the first predefined classification model according to the predefined machine learning algorithm and the positive sample.

Optionally, the apparatus further includes a second sample area obtaining module and a sample area classification module; wherein, the second sample area obtaining module is configured for obtaining a sample area that is a non-license plate area;

the sample area classification module is configured for classifying the obtained sample area according to content of the obtained sample area to obtain negative samples of multiple categories; and wherein, the classification model obtaining module is configured for obtaining the first predefined classification model according to the machine learning algorithm, the positive sample, and the negative samples of multiple categories.

Optionally, the apparatus further includes a brightness determining module, a grey-equalization module and a second license plate area determining module; wherein, the brightness determining module is configured for determining, in response to a determination that the candidate license plate area $M_2$, is not a license plate area, whether brightness of the candidate license plate area $M_2$ is within a predefined range of brightness, and if the brightness is not within the predefined range of brightness, activating the grey-equalization module;

the grey-equalization module is configured for performing a grey equalization on the candidate license plate area $M_2$;

the second license plate area determining module is configured for determining whether the grey-equalized candidate license plate area $M_2$ is a license plate area according to a second predefined classification model, and if so, activating the detection result generating module, wherein, the second predefined classification model is a classification model obtained by learning grey-equalized sample license plate areas through a machine learning algorithm.

For the purpose above, embodiments of the present application also disclose a terminal, including: a housing, a processor, a memory, a circuit board and a power supply circuit, wherein, the circuit board is placed within the space enclosed by the housing; the processor and memory are disposed on the circuit hoard; the power supply circuit is configured for supplying power to circuits and devices of the terminal; the memory is configured for storing executable program instructions; and the processor is configured for executing the executable program instructions stored in the memory to perform the method for detecting a license plate as described above.

For the purpose above, embodiments of the present application also disclose an executable program, configured for performing, when executed, the method for detecting a license plate as described above.

For the purpose above, embodiments of the present application also disclose a storage medium, configured for storing executable program codes which, when executed, perform the method for detecting a license plate as described above.

As can be appreciated from above, in embodiments of the present application, a detection terminal may obtain, after receipt of an image to be detected, a candidate license plate area $M_1$ in the image to be detected according to pixel values of pixels in the image to be detected. In a case where the aspect ratio of the candidate license plate area $M_1$ is greater than a first predefined threshold, a candidate license plate area $M_2$ may be determined from the candidate license plate area $M_1$ according to a predefined machine learning-based regression algorithm. A determination is made, according to a machine learning-based first predefined classification model, as to whether the candidate license plate area $M_2$ is a license plate area. If so, the candidate license plate area $M_2$ is determined as the license plate area and a detection result is generated based on the candidate license plate area $M_2$. As such, a candidate license plate area containing a real license plate may be prevented from being wrongly determined as a non-license plate area due to its excessively large aspect ratio. The accuracy of license plate detection is thus improved, in addition, instead of establishing a classification model by means of manual setting, a first predefined classification model based on machine learning is used to acquire features of a candidate license plate area, so as to classify the candidate license plate area and thereby determine if a candidate license plate area is a license plate area. The accuracy of license plate detection is further improved.

BRIEF DESCRIPTION OF THE DRAWINGS

To describe the solutions of embodiments of the present application and the prior art more clearly, the accompanying drawings to be used in the embodiments and the prior art are described briefly below. Obviously; the accompanying drawings described below are merely some embodiments of the application, based on which those skilled in the art can obtain other drawings without creative efforts.

DETAILED DESCRIPTION

Technical solutions in the embodiments of the present application are clearly and completely described below with reference to the accompanying drawings in association with embodiments of the present application. Obviously, the described embodiments are merely a part of but not all the embodiments of the present application. All other embodiments obtained without creative efforts in view of the embodiments of the present application by those skilled in the art fall within the scope of the present application.

A detailed description of the present disclosure is provided below with reference to specific embodiments.

Figure 1:
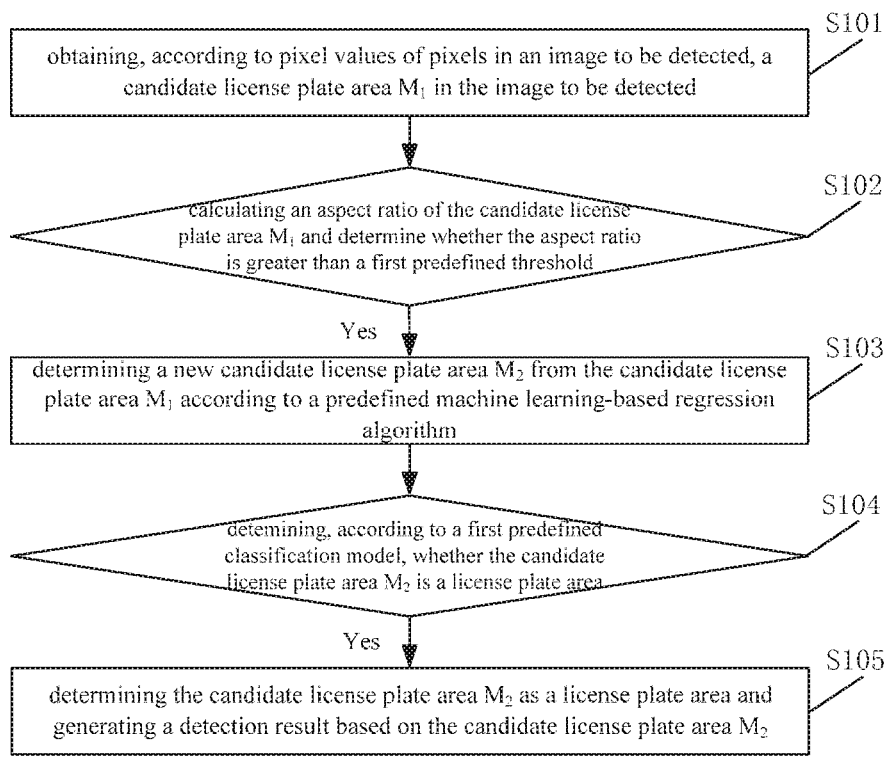
FIG. 1 is a schematic flow chart of a method for detecting a license plate provided by an embodiment of the present disclosure.

Referring to FIG. 1, a schematic flow chart of a method for detecting a license plate provided by an embodiment of the present application is illustrated. The method may includes the following steps.

S101, obtaining, according to pixel values of pixels in an image to be detected, a candidate license plate area $M_1$ in the image to be detected.

In general, after receipt of an image to be detected, a detection terminal may determine an area in the image that is likely to contain license plate content (i.e., a candidate license plate area $M_1$) according to pixel values of pixels in the image to be detected. In an example, a pixel having a greyscale jump value greater than a predefined threshold in each pixel row is obtained; a pixel segment between two pixels satisfying a predefined greyscale jump rule is then determined as a valid pixel segment; and valid pixel segments vertically adjacent to each other and having a boundary similarity greater than another predefined threshold are merged to obtain the candidate license plate area $M_1$.

S102, calculating an aspect ratio of the candidate license plate area $M_1$ and determine whether the aspect ratio is greater than a first predefined threshold, and if so, proceeding to step S103.

The first predefined threshold may be determined based on an aspect ratio of a real license plate that is actually used. For example, a real license plate has a width and height of 440 mm*140 mm. As such, the first predefined threshold may be set to 440/140≈3.14.

In an image of an actual traffic scene, many background areas that are similar to the real license plate area may be present around the actual license plate area. Therefore, in detecting license plates, if the candidate license plate area $M_1$ has a too high aspect ratio, the candidate license plate area $M_1$ would contain too many areas that do not belong to a license plate. As such, when determining whether the candidate license plate area $M_1$ is a real license plate area, features of a non-license plate area may be liable to be taken into consideration. As a result, the candidate license plate area $M_1$ tend to be determined as a non-license plate area. This may lead to an erroneous determination if the candidate license plate area $M_1$ actually contains a real license plate area. Therefore, to obtain a proper candidate license plate area, it is necessary to determine if the aspect ratio of the candidate license plate area $M_1$ is greater than the first predefined threshold and then adjust the aspect ratio of the candidate license plate area $M_1$ if the determination is positive.

In one implementation of the present disclosure, the candidate license plate area $M_1$ may be determined as a candidate license plate area $M_1$ if the aspect ratio is determined to be not greater than the first predefined threshold. The method then proceeds to step S104.

S103, determining a new candidate license plate area $M_2$ from the candidate license plate area $M_1$ according to a predefined machine learning-based regression algorithm.

At this point, the candidate license plate area $M_2$ is an area whose aspect ratio is no greater than the first predefined threshold.

In addition, the abovementioned machine learning-based regression algorithm is a boundary regression algorithm constructed by learning features of a sample area. Typically, machine learning-based regression algorithm may include learning, from a sample area, features of an object in the sample by means of model training; and then determining a boundary of the object according to the learned features of the object.

It is noted that, the features of an object learned by means of the machine learning-based regression algorithm are more comprehensive than those manually set by a user. Accordingly, the determination of boundary is more accurate, and inference on license plate detection introduced by background textures may be significantly reduced.

S104, determining, according to a first predefined classification model, whether the candidate license plate area $M_2$ is a license plate area, and if so, proceeding to step S105.

The first predefined classification model may be a classification model obtained by learning sample license plate areas through a machine learning algorithm. In the construction of the first classification model, a large amount of sample license plate areas previously found may be learned through a machine learning algorithm so as to obtain a classification model, which may be used to divide simply an area into a license plate area and non-license plate area.

A person of ordinary skill in the art may appreciate that, in the construction of the first predefined classification model, the greater the number and variety of sample license plate areas are, the better the classification model is constructed.

In one implementation of the present application, the first predefined classification model described above may be a random forest-, support vector machine-, deep neural network- or convolutional neural network-based classification model. In an example of the convolutional neural network-based classification model, convolutional features of the candidate license plate area $M_2$ may be obtained with the convolutional neural network-based classification model. The obtained convolutional features may then be used to classify the candidate license plate area $M_2$ to determine if it is a license plate area. In an embodiment of the present application, in the application of the machine-learning classification model, instead of being manually set by a user, features that would facilitate the classification are learned from sample license plate areas. Generalization capability of the machine learning algorithm and accuracy of license plate detection may thus be improved.

In one implementation of the present application, the first predefined classification model may be obtained though the following steps.

S11, obtaining a sample license plate area having a boundary accuracy above the predefined accuracy threshold and/or a sample license plate area having an aspect ratio below the first predefined threshold, and taking the obtained sample license plate area as a positive sample.

The boundary accuracy may represent a distance between a boundary of a sample license plate area and a boundary of a real license plate, or the coherence of a real license plate. The present application is not limited in this aspect.

S12, obtaining the first predefined classification model according to the predefined machine learning algorithm and the positive sample.

In general, a sample license plate area having a boundary accuracy above a predefined accuracy threshold and/or a sample license plate area having an aspect ratio below a first predefined threshold are considered as two types of positive samples, and the first predefined classification model is trained with a machine learning algorithm. With types of sample license plate areas distinctly distinguished in this way, the first predefined classification model may have an increased immunity to interference of background noise.

In practice, for the purpose of an increased accuracy of license plate detection, a negative sample may also need to be obtained for the training of model in order to obtain the first predefined classification model. Therefore, in one implementation of the present application, the method may include, before step S12, the following steps.

S13, obtaining a sample area that is a non-license plate area.

The non-license plate area herein may include areas of, for example, lanes, green belts, isolation fences, and a door, window, lamp, radiator grille, logo, and mobile billboard of a vehicle.

S14, classifying the obtained sample area according to the content of the obtained sample area so as to obtain negative samples of multiple categories.

In the example above, areas of lanes, green belts and isolation fences may be classified into sample license plate areas of a road surface-category, areas of a door, window, lamp, radiator grille of a vehicle may be classified into sample license plate areas of a vehicle body-category, and areas of logo and mobile billboard of a vehicle may be classified into sample license plate areas of a vehicle graphic-category. Of course, there may be sample areas of other categories, description of which is omitted herein.

In this case, step S12 may include:

obtaining the first predefined classification model according to the machine learning algorithm, the positive sample, and the negative samples of multiple categories.

Such a specific classification of samples may facilitate convergence of the model and may thus improve the accuracy of license plate detection.

S105, determining the candidate license plate area $M_2$ as a license plate area and generating a detection result based on the candidate license plate area $M_2$.

In one implementation of the present application, the detection result, after being generated, may be stored in a detection terminal. The detection results may then be transmitted to a predefined terminal when the number of the results has reached a certain amount, so as to avoid the situation that the predefined terminal frequently receives detection results, which may have an impact on user's utilization of the terminal. Alternatively, after the generation of the detection result, the generated detection result may also be directly transmitted to the predefined terminal so as to timely notify the user of the license plate detection result.

In the embodiment as shown in FIG. 1, a detection terminal may obtain, after receipt of an image to be detected, a candidate license plate area $M_1$ in the image to be detected according to pixel values of pixels in the image to be detected. In a case where the aspect ratio of the candidate license plate area $M_1$ is greater than a first predefined threshold, a new candidate license plate area $M_2$ may be determined from the candidate license plate area $M_1$ according to a predefined machine learning-based regression algorithm. A determination is made, according to a machine learning-based first predefined classification model, as to whether the candidate license plate area $M_2$ is a license plate area. If so, the candidate license plate area $M_2$ is determined as the license plate area and a detection result is generated based on the candidate license plate area $M_2$. As such, a candidate license plate area containing a real license plate may be prevented from being wrongly determined as a non-license plate area due to its excessively large aspect ratio. The accuracy of license plate detection is thus improved. In addition, instead of establishing a classification model by means of manual setting, a first predefined classification model based on machine learning is used to acquire features of a candidate license plate area, so as to classify the candidate license plate area and thereby determine if a candidate license plate area is a license plate area. The accuracy of license plate detection is further improved.

Figure 2:
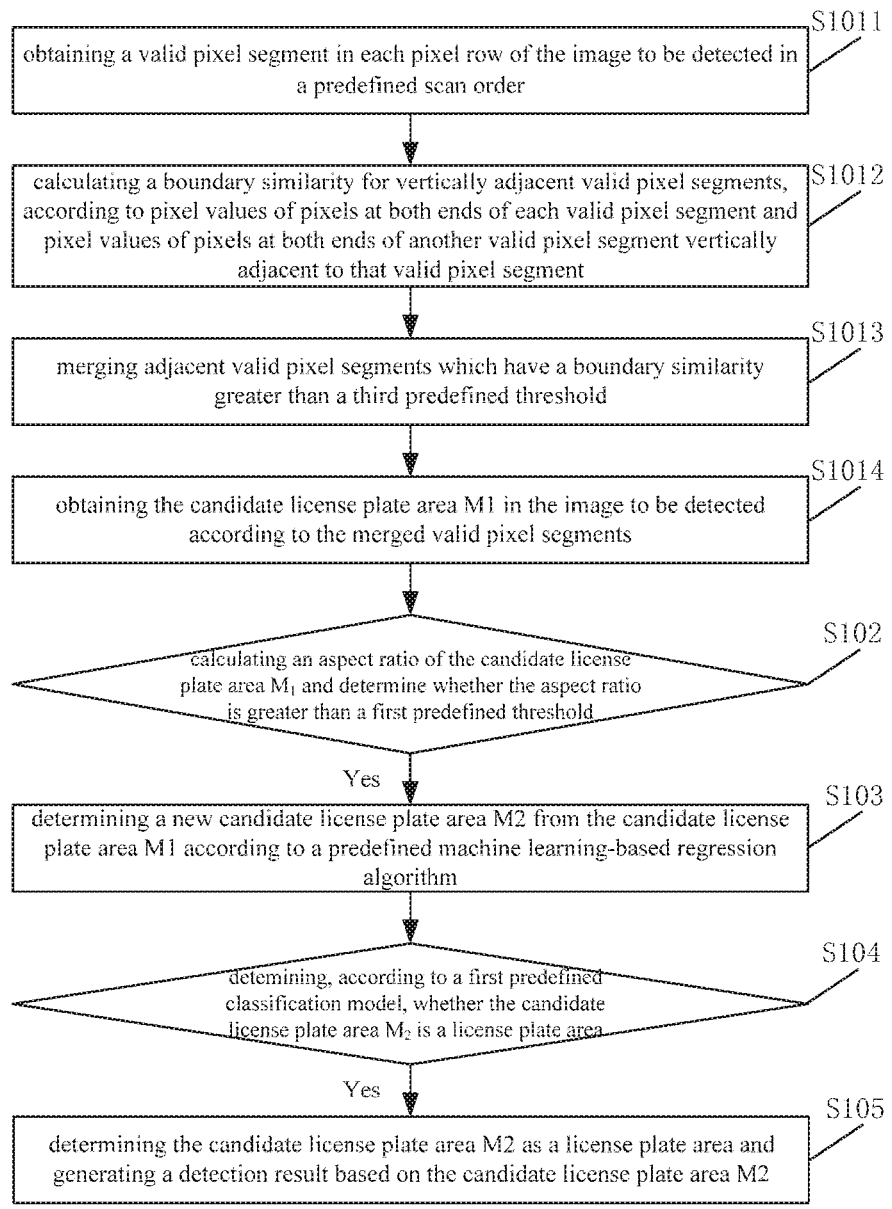
FIG. 2 is a schematic flow chart of another method for detecting a license plate provided by another embodiment of the present disclosure.

Referring to FIG. 2, wherein a schematic flow chart of another method for detecting a license plate is illustrated. In this method, step S101 may further include the following steps.

S1011, obtaining a valid pixel segment in each pixel row of the image to be detected in a predefined scan order.

A valid pixel segment is a pixel segment that is determined according to pixels having a greyscale jump value greater than a second predefined threshold in a pixel row.

In one implementation of the present disclosure, the predefined scan order may include a lateral progressive scan or an interleave scan. Other orders are also possible. The present application is not limited in this aspect.

In one implementation of the present application, the step S1011 as described above may include:

obtaining, according to a predefined scan order, a valid pixel segment in each pixel row of the image to be detected through the following steps:

S21, calculating a greyscale jump value of each pixel in a pixel row X.

The pixel row X may be any pixel row in the image to be detected.

It is noted that, the greyscale jump value of a pixel is the difference between the pixel value of this pixel and the pixel value of the previously scanned pixel.

S22, selecting pixels having a greyscale value greater than the second predefined threshold.

In a practical application, a license plate may have prescribed colors, for example, white characters on blue, black characters on yellow, white characters on black and black characters on white. As such, the greyscale jump value between a pixel in the background of the license plate and a pixel in the character string of the license plate may be predetermined. Therefore, the second predefined threshold may be determined based on a greyscale jump value between the bottom and characters of a real license plate (i.e., background and foreground of the license plate). In an example, if a greyscale jump value between the bottom and characters of a real license plate is 10, the second predefined threshold may be determined as 10. In addition, the second predefined threshold may be set as a multiple of the greyscale jump value between the bottom and characters of a real license plate when influences such as environment factors and resolution of an image acquiring device are taken into consideration. For example, the second defined threshold may be set as 0.8 times the greyscale jump value between the bottom and characters of a real license plate.

S23, determining a candidate pixel segment in the pixel row X according to a pixel having a maximum horizonal coordinate and a pixel having a minimum horizonal coordinate among the selected pixels.

S24, determining whether greyscale jump values of pixels in the candidate pixel segment conform to a predefined greyscale jumping rule; and if so, proceeding to step S25.

In a practical application, characters on a license plate have a prescribed type and arrangement. For example, the characters are organized as including a Chinese character, a letter, a ".", and five characters (including a letter, number, or a Chinese character). Therefore, greyscale jump values of pixels in each pixel row of a license plate area may vary regularly. A greyscale jumping rule may be set according to such a variation. A candidate pixel segment in a pixel row of a candidate license plate may be determined as a valid pixel segment if it satisfies the greyscale jumping rule.

In one implementation of the present application, a determined candidate pixel segment may be excessively long, such that when being conformed to the predefined greyscale jumping rule, some part of the candidate pixel segment is found to satisfy the greyscale jumping rule while another part does not satisfy the greyscale jumping rule. In this case, the part that satisfies the greyscale jumping rule may be truncated as a candidate pixel segment.

S25, determining the candidate pixel segment as a valid pixel segment.

S1012, calculating a boundary similarity for vertically adjacent valid pixel segments, according to pixel values of pixels at both ends of each valid pixel segment and pixel values of pixels at both ends of another valid pixel segment vertically adjacent to that valid pixel segment.

The boundary similarity may be the difference (or ratio) between a pixel value of a pixel at either end of a valid pixel segment and a pixel value of a pixel at either end of a vertically adjacent valid pixel segment. The present application is not limited in this aspect.

In an example, two vertically adjacent valid pixel segments are respectively denoted as X1 and X2. X1 has a left end A and a right end B, while X2 has a left end C and a right end D. In this case, the boundary similarity between X1 and X2 may be the difference (or ratio) between A and B (or between C and D), or the difference (or ratio) between A and C (or between B and D).

S1013, merging adjacent valid pixel segments which have a boundary similarity greater than a third predefined threshold.

In a practical application, a license plate occupies, in an image to be detected, a certain area rather than a single pixel row. Therefore, a merging of adjacent valid pixel segments that have a boundary similarity above a third predefined threshold may be required.

S1014, obtaining the candidate license plate area $M_1$ in the image to be detected according to the merged valid pixel segments.

Typically, a merged valid pixel segment may be taken as a candidate license plate area $M_1$ in an image to be detected. However, the boundary of the merged valid pixel segment may not be a straight or substantially straight line, but a irregular curve. In this case, a further determination of the boundary of the candidate license plate area $M_1$ may be required. Therefore, the step S1014 as described above may include:

S26, determining a suspected character string area in the merged valid pixel segments.

S27, obtaining color information of character string according to a pixel value of a pixel in the suspected character string area, and obtaining color information of background according to a pixel value of a pixel not in the non-suspected character string area in the merged valid pixel segments.

In a practical application, the bottom (background) and characters (foreground) of a license plate may have prescribed colors. As such, the color contrast between the bottom and characters is predetermined. Therefore, color information of the bottom and characters of the license plate may be obtained so as to determine the boundary of the candidate license plate area.

S28, determining boundary of the candidate license plate $M_1$ according to the color information of character string and the color information of background.

Assuming that the color of the character string is determined to be white and the color of background is determined to be black, then an area adjacent to the suspected character string area and having a color of black may be determined as a background area, the boundary of which represents the boundary of the candidate license plate area.

In addition, the color information of character string as described above may be an average A1 of pixel values of all the pixels in the suspected character string area, and the color information of background may be an average A2 of pixel values of all the pixels in the non-suspected character area. A fourth predefined threshold may be determined according to the ratio of A1 and A2. If a radio between an average A3 of pixel values of all the pixels in an area adjacent to the suspected character string area and A1 matches with the fourth predefined threshold, the adjacent area may be determined as a background area, the boundary of which represents the boundary of the candidate plate license area.

S29, obtaining the candidate license plate area M1 according to the determined boundary.

In addition, a license plate detection method based on edge features of a license plate or a genetic algorithm may be utilized, in the present application, to determine the candidate license plate area. An Adaboost license plate detector based on Harr features may also be used to determine the candidate license plate area. The present application is not limited in this aspect. However, compared with the method for detecting a candidate license plate area described above, these methods for detecting a candidate license plate area is more complex and have a relatively poor generalization capability.

In the embodiment as shown in FIG. 2, the detection terminal obtains, according to a predefined scan order, a valid pixel segment in a pixel row of an image to be detected, calculates a boundary similarity between vertically adjacent valid pixel segments according to pixel values of pixels at both ends of each valid pixel segment and pixel values of pixels at both ends of another valid pixel segment vertically adjacent to that valid pixel segment, merges adjacent valid pixel segments that have a boundary similarity above a third predefined threshold, obtains a candidate license plate area $M_1$ according to the merged valid pixel segment. This method for obtaining a candidate license plate area is simple and easy for implementation. The universality and generalization of a license plate detection method is thus improved.

Figure 3:
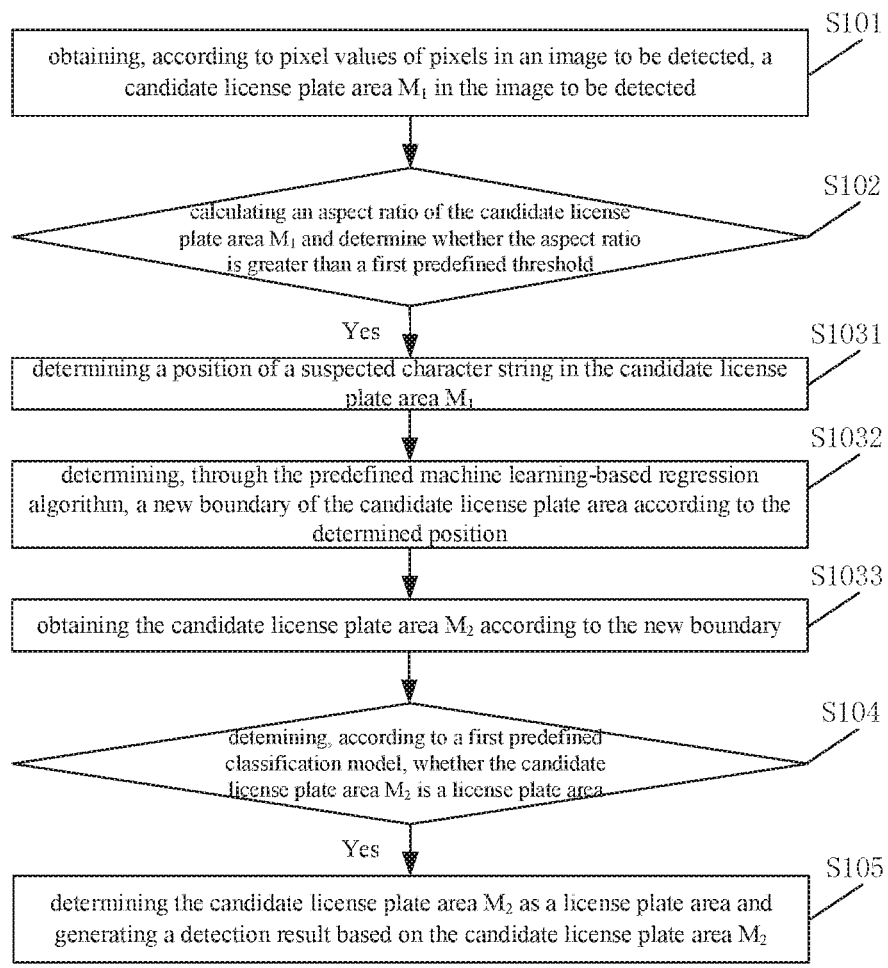
FIG. 3 is a schematic flow chart of another method for detecting a license plate provided by another embodiment of the present disclosure.

Referring to FIG. 3, wherein a schematic flow chart of another method for detecting license plate area is illustrated.

S1031, determining a position of a suspected character string in the candidate license plate area $M_1$.

An aspect ratio of the candidate license plate area $M_1$ larger than a first predefined threshold indicates that the candidate license plate area $M_1$ contains excessive background areas. Excessive background areas may produce background noise that would cause interference in the detection of a license plate area. The accuracy of license plate detection is thus reduced. Therefore, if the candidate license plate area $M_1$ has an aspect ratio larger than a first predefined threshold, a new candidate license plate area may have to be determined. A license plate area definitely contains license plate characters. Therefore, in the determination of the new candidate license plate area, a position of a suspected character string in the candidate license plate area $M_1$ may first be determined, and then the new candidate license plate may be determined based on the position.

S1032, determining, through the predefined machine learning-based regression algorithm, a new boundary of the candidate license plate area according to the determined position.

In one implementation of the present application, by means of the predefined machine learning-based regression algorithm above described, features of object are not manually set by a user but learned based on machine learning. Object features obtained in this way are more comprehensive. Therefore, the boundary may be more accurately determined and interference on the license plate detection introduced by background textures may be effectively reduced.

S1033, obtaining the candidate license plate area $M_2$ according to the new boundary.

After the boundary is determined, the area within the boundary is the candidate license plate area $M_2$.

In the embodiment as shown in FIG. 3, in a case where the aspect ratio of a candidate license plate area $M_1$ is larger than a first predefined threshold, the detection terminal first determines a position of a suspected character string in the candidate license plate area $M_1$. The detection terminal then determines, by means of a predefined machine learning-based regression algorithm, a new boundary of the candidate license plate area according to the determined position. A candidate license plate area $M_2$ is then determined according to the new boundary. As such, features are learned by means of a machine learning-based regression algorithm rather than being manually set by a user. As a result of the determination of the candidate license plate area based on a regression algorithm, the boundary may be more accurately determined and interference on the license plate detection introduced by background textures may be effectively reduced.

Figure 4:
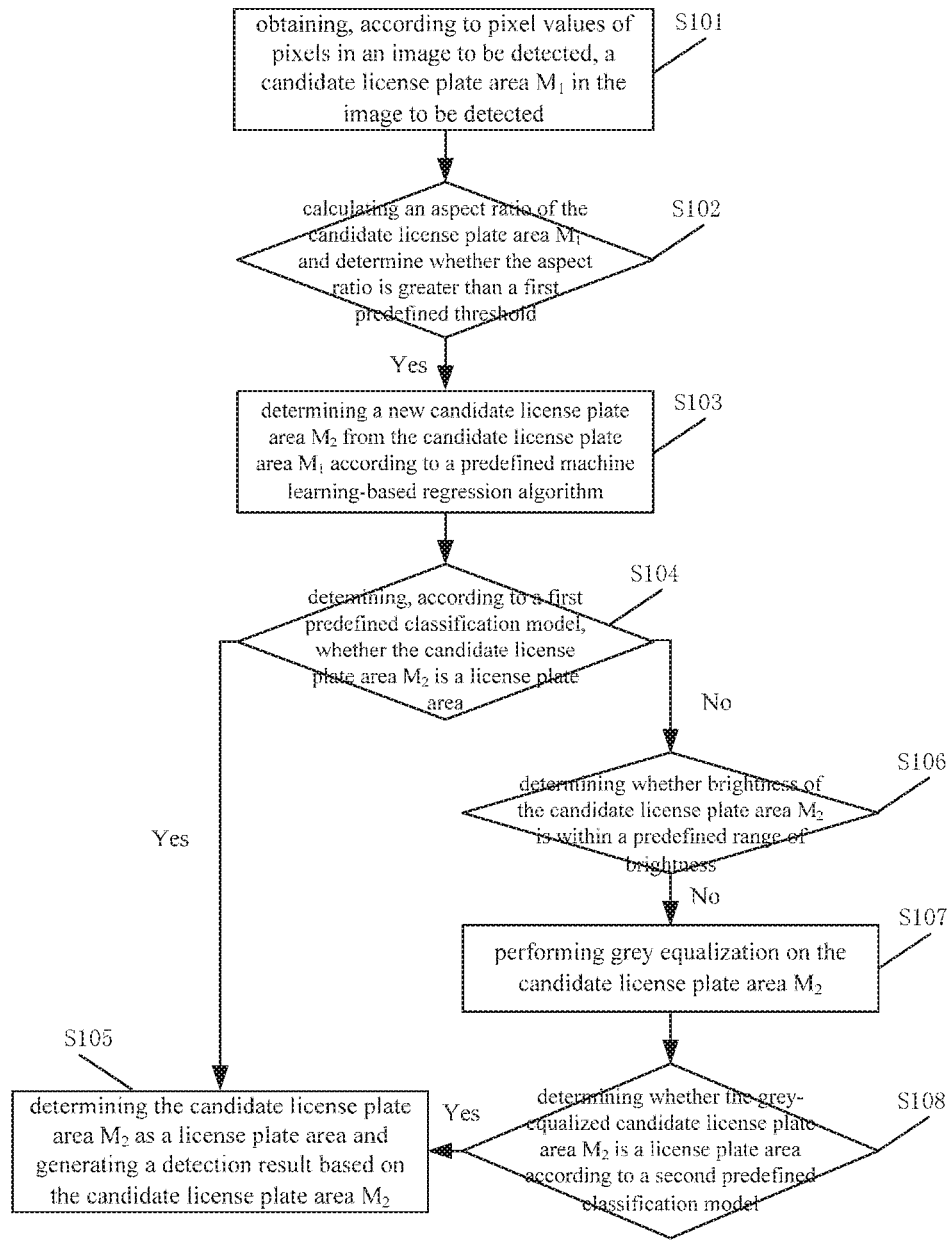
FIG. 4 is a schematic flow chart of another method for detecting a license plate provided by another embodiment of the present disclosure.

Referring to FIG. 4, wherein a schematic flow chart of another method for detecting license plate area is illustrated. The method may further include the following steps.

S106, determining whether brightness of the candidate license plate area $M_2$ is within a predefined range of brightness, and if so, proceeding to step S107.

In one implementation of the present application, the brightness of the candidate license plate area $M_2$ may be an average of brightness of all the pixels in the candidate license plate area $M_2$, or an average of brightness of all the pixels in a certain part of the candidate license plate area $M_2$, or otherwise an average of brightness of a predefined number of pixels randomly selected from the candidate license plate area $M_2$. The present application is not limited in this aspect.

In one implementation of the present application, in response to a determination that the candidate license plate area $M_2$ is not a license plate area, a determination is made as to whether the brightness of the candidate license plate area $M_2$ is within a predefined range of brightness, and if so, the candidate license plate area $M_2$ may be determined as a non-license plate area. The process of license plate detection thus terminates.

S107, performing grey equalization on the candidate license plate area $M_2$.

The method of grey equalization is a well known prior art and thus is not described in detail herein.

S108, determining whether the grey-equalized candidate license plate area $M_2$ is a license plate area according to a second predefined classification model, and if so, proceeding to step S105 to generate a detection result.

The second predefined classification model is a classification obtained by learning grey-equalized sample license plate areas through a machine learning algorithm.

In one implementation of the present application, in a case where a determination is made that the grey-equalized candidate license plate area $M_2$ is not a license plate area, the candidate license plate area $M_2$ may be determined as a non-license plate area. The process of license plate detection terminates.

In addition, in one implementation of the present application, the second predefined classification model may be obtained in the same manner as the first predefined classification model.

It is noted that, in the acquisition of the second predefined classification model, positive and the negative samples used for model training are all grey-equalized sample license plate areas.

In the embodiment as shown in FIG. 4, in a case where the candidate license plate area $M_2$ is a non-license plate area, the detection terminal determines whether the brightness of the candidate license plate area $M_2$ is within a predefined range of brightness. If the brightness is not within the predefined range of brightness, a grey equalization is performed on the candidate license plate area $M_2$. A determination is then made, according to a second predefined classification model, as to whether the grey-equalized candidate license plate area $M_2$ is a license plate area; and if so, the candidate license plate area $M_2$ is determined as a license plate area. A detection result may thus be generated according to the candidate license plate area $M_2$. As such, a candidate license plate $M_2$ containing a real license plate is prevented from being wrongly determined as a non-license plate area due to excessive or insufficient brightness of the candidate license plate area $M_2$. The accuracy of license plate determination is thus improved.

Figure 5:
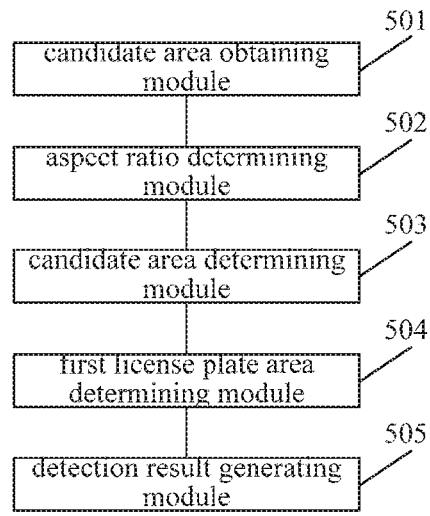
FIG. 5 is a structural schematic diagram of an apparatus for detecting a license plate provided by an embodiment of the present disclosure.

Referring to FIG. 5, a structural diagram of an apparatus for detecting a license plate as provided by an embodiment of the present disclosure is illustrated. The apparatus includes a candidate area obtaining module 501, an aspect ratio determining module 502, a candidate area determining module 503, a first license plate area determining module 504 and a detection result generating module 505.

The candidate area obtaining module 501 is configured for obtaining, according to pixel values of pixels in an image to be detected, a candidate license plate area $M_1$ in the image to be detected.

The aspect ratio determining module is configured for calculating an aspect ratio of the candidate license plate area $M_1$ and determining whether the aspect ratio is greater than a first predefined threshold, and activating the candidate area determining module 503 if the aspect ratio is greater than a first predefined threshold.

The candidate area determining module 503 is configured for determining a new candidate license plate area $M_2$, from the candidate license plate area $M_1$ according to a predefined machine learning-based regression algorithm, wherein the candidate license plate area $M_2$ is an area whose aspect ratio is no greater than the first predefined threshold.

The first license plate area determining module 504 is configured for determining, according to a first predefined classification model, whether the candidate license plate area $M_2$ is a license plate area, wherein, the first predefined classification model is a classification model obtained by learning sample license plate areas through a machine learning algorithm, and activating the detection result generating module 505 if the candidate license plate area $M_2$ is a license plate area.

The detection result generating module 505 is configured for determining the candidate license plate area $M_2$ as a license plate area, and generating a detection result based on the candidate license plate area $M_2$.

In one implementation of the present application, the apparatus for detecting a license plate may further include a first sample area obtaining module and a classification model obtaining module (not shown in FIG. 5).

The first sample area obtaining module is configured for obtaining a sample license plate area having a boundary accuracy greater than a predefined accuracy threshold and/or a sample license plate area having an aspect ratio less than the first predefined threshold, and taking the obtained sample license plate area as a positive sample.

The classification model obtaining module is configured for obtaining the first predefined classification model according to the predefined machine learning algorithm and the positive sample.

In one implementation of the present application, the apparatus for detecting a license plate may further include a second sample area obtaining module and a sample area classification module (not shown in FIG. 5).

The second sample area obtaining module is configured for obtaining a sample area that is a non-license plate area.

The sample area classification module is configured for classifying the obtained sample area according to content of the obtained sample area to obtain negative samples of multiple categories.

In this case, the classification model obtaining module is specifically configured for obtaining the first predefined classification model according to the machine learning algorithm, the positive sample, and the negative samples of multiple categories.

In the embodiment as shown in FIG. 5, a detection terminal may obtain, after receipt of an image to be detected, a candidate license plate area $M_1$ in the image to be detected according to pixel values of pixels in the image to be detected. In a case where the aspect ratio of the candidate license plate area $M_1$ is greater than a first predefined threshold, a new candidate license plate area $M_2$ may be determined from the candidate license plate area $M_1$ according to a predefined machine learning-based regression algorithm. A determination is made, according to a machine learning-based first predefined classification model, as to whether the candidate license plate area $M_2$ is a license plate area. If so, the candidate license plate area $M_2$ is determined as the license plate area and a detection result is generated based on the candidate license plate area $M_2$. As such, a candidate license plate area containing a real license plate may be prevented from being wrongly determined as a non-license plate area due to its excessively large aspect ratio. The accuracy of license plate detection is thus improved. In addition, instead of establishing a classification model by means of manual setting, a first predefined classification model based on machine learning is used to acquire features of a candidate license plate area, so as to classify the candidate license plate area and thereby determine if a candidate license plate area is a license plate area. The accuracy of license plate detection is further improved.

Figure 6:
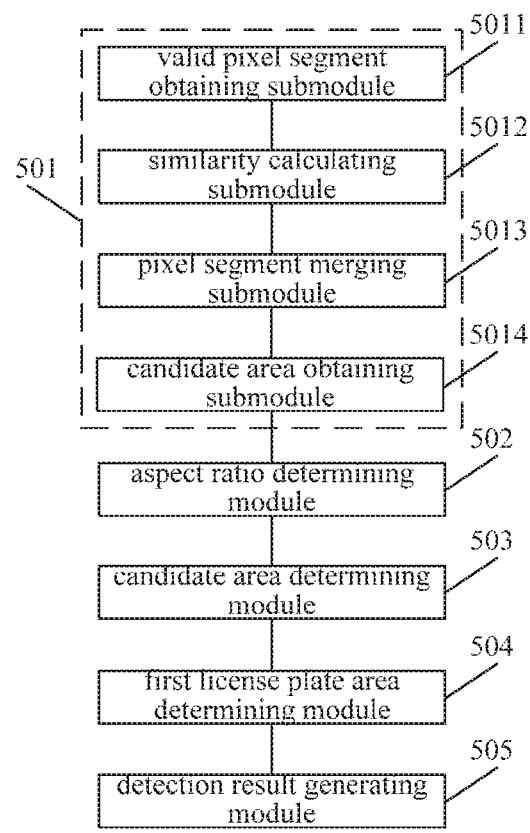
FIG. 6 is a structural schematic diagram of an apparatus for detecting a license plate provided by another embodiment of the present disclosure.

Referring to FIG. 6, wherein a structural diagram of another apparatus for detecting a license plate as provided by an embodiment of the present disclosure is illustrated. In the apparatus, the candidate area obtaining module 501 includes a valid pixel segment obtaining submodule 5011, a similarity calculating submodule 5012, a pixel segment merging submodule 5013 and a candidate area obtaining submodule 5014.

The valid pixel segment obtaining submodule 5011 is configured for obtaining a valid pixel segment in each pixel row of the image to be detected in a predefined scan order, wherein, the valid pixel segment is a pixel segment that is determined according to pixels having a greyscale jump value greater than a second predefined threshold in a pixel row.

The similarity calculating submodule 5012 is configured for calculating a boundary similarity for vertically adjacent valid pixel segments, according to pixel values of pixels at both ends of each valid pixel segment and pixel values of pixels at both ends of another valid pixel segment vertically adjacent to that valid pixel segment.

The pixel segment merging submodule 5013 is configured for merging adjacent valid pixel segments which have a boundary similarity greater than a third predefined threshold.

The candidate area obtaining submodule 5014 is configured for obtaining the candidate license plate area $M_1$ in the image to be detected according to the merged valid pixel segments.

In one implementation of the present application, the valid pixel segment obtaining submodule 5011 is configured for obtaining a valid pixel segment in each pixel row of the image to be detected in a predefined scan order.

In this case, the valid pixel segment obtaining submodule 5011 may include a greyscale jump value calculating unit, a pixel selecting unit, a candidate pixel segment obtaining unit, a greyscale jump determining unit and a valid pixel segment determining unit (not shown in FIG. 6).

The greyscale jump value calculating unit is configured for calculating a greyscale jump value of each pixel in a pixel row X, wherein the pixel row X is any pixel row in the image to be detected.

The pixel selecting unit is configured for selecting pixels having a greyscale value greater than the second predefined threshold.

The candidate pixel segment obtaining unit is configured for obtaining a candidate pixel segment in the pixel row X according to a pixel having a maximum horizonal coordinate and a pixel having a minimum horizon coordinate among the selected pixels.

The greyscale jump determining unit is configured for determining whether greyscale jump values of pixels in the candidate pixel segment conform to a predefined greyscale jumping rule, and if so, activating the valid pixel segment determining unit.

The valid pixel segment determining unit is configured for determining the candidate pixel segment as a valid pixel segment.

In one implementation of the present application, the candidate area obtaining submodule 5014 may include a suspected character string area determining unit, a color information obtaining unit, a boundary determining unit and a candidate area obtaining unit (not shown in FIG. 6).

The suspected character string area determining unit is configured for determining a suspected character string area in the merged valid pixel segments.

The color information obtaining unit is configured for obtaining color information of character string according to a pixel value of a pixel in the suspected character string area, and obtaining color information of background according to a pixel value of a pixel not in the non-suspected character string area in the merged valid pixel segments.

The boundary determining unit is configured for determining boundary of the candidate license plate $M_1$ according to the color information of character string and the color information of background.

The candidate area obtaining unit is configured for obtaining the candidate license plate area $M_1$ according to the determined boundary.

In the embodiment as shown in FIG. 6, the detection terminal obtains, according to a predefined scan order, a valid pixel segment in a pixel row of an image to be detected, calculates a boundary similarity between vertically adjacent valid pixel segments according to pixel values of pixels at both ends of each valid pixel segment and pixel values of pixels at both ends of another valid pixel segment vertically adjacent to that valid pixel segment, merges adjacent valid pixel segments that have a boundary similarity above a third predefined threshold, obtains a candidate license plate area $M_1$ according to the merged valid pixel segment. This method for obtaining a candidate license plate area is simple and easy for implementation. The universality and generalization of a license plate detection method is thus improved.

Figure 7:
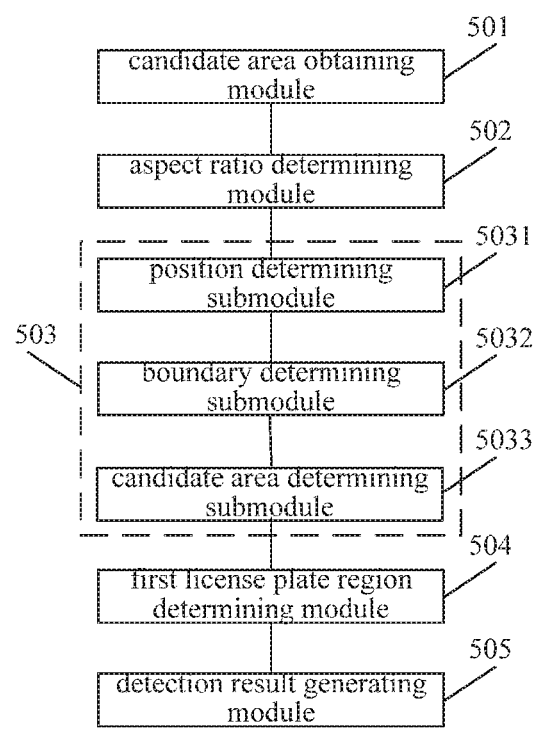
FIG. 7 is a structural schematic diagram of an apparatus for detecting a license plate provided by another embodiment of the present disclosure.

Referring to FIG. 7, a structural diagram of another apparatus for detecting a license plate as provided by an embodiment of the present disclosure is illustrated. In the apparatus, the candidate area determining module 503 includes a position determining submodule 5031, a boundary determining submodule 5032 and a candidate area determining submodule 5033.

The position determining submodule 5031 is configured for determining a position of a suspected character string in the candidate license plate area $M_1$.

The boundary determining submodule 5032 is configured for determining, through the predefined machine learning-based regression algorithm, a new boundary of the candidate license plate area according to the determined position.

The candidate area determining submodule 5033 is configured for obtaining the candidate license plate area $M_2$ according to the new boundary.

In the embodiment as shown in FIG. 7, in a case where the aspect ratio of a candidate license plate area $M_1$ is larger than a first predefined threshold, the detection terminal first determines a position of a suspected character string in the candidate license plate area $M_1$. The detection terminal then determines, by means of a predefined machine learning-based regression algorithm, a new boundary of the candidate license plate area according to the determined position. A candidate license plate area $M_2$ is then determined according to the new boundary. As such, features are learned by means of a machine learning-based regression algorithm rather than being manually set by a user. As a result of the determination of the candidate license plate area based on a regression algorithm, the boundary may be more accurately determined and interference on the license plate detection introduced by background textures may be effectively reduced.

Figure 8:
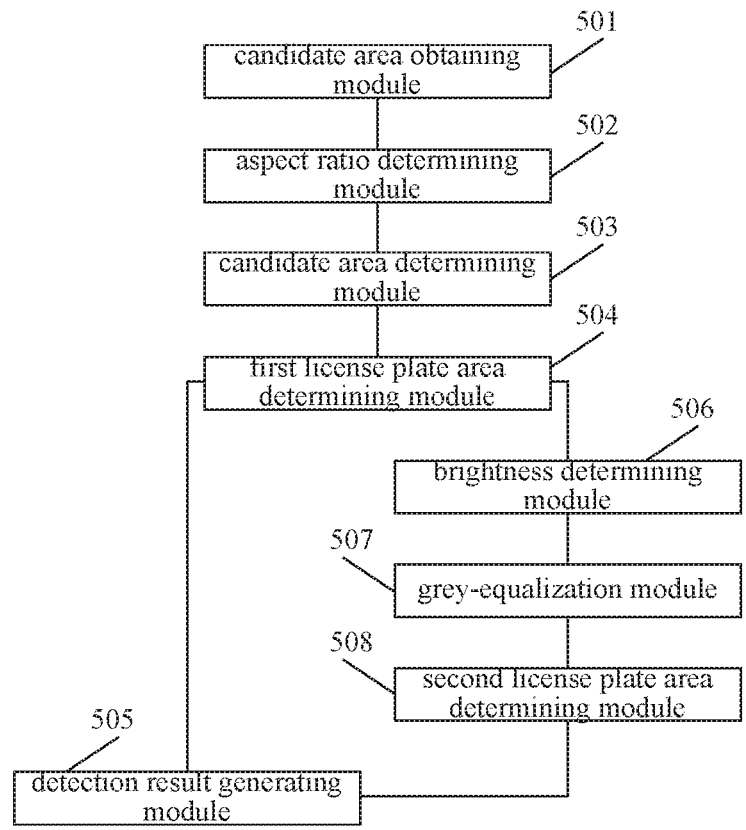
FIG. 8 is a structural schematic diagram of an apparatus for detecting a license plate provided by another embodiment of the present disclosure.

Referring to FIG. 8, a structural diagram of another apparatus for detecting a license plate as provided by an embodiment of the present disclosure is illustrated. The apparatus further includes a brightness determining module 506, a grey-equalization module 507 and a second license plate area determining module 508.

The brightness determining module 506 is configured for determining, in response to a determination that the candidate license plate area $M_2$ is not a license plate area, whether brightness of the candidate license plate area $M_2$ is within a predefined range of brightness, and if the brightness is not within the predefined range of brightness, activating the grey-equalization module 507.

The grey-equalization module 507 is configured for performing grey equalization on the candidate license plate area $M_2$.

The second license plate area determining module 508 is configured for determining whether the grey-equalized candidate license plate area $M_2$ is a license plate area according to a second predefined classification model, and if so, activating the detection result generating module 505, wherein, the second predefined classification model is a classification model obtained by learning grey-equalized sample license plate areas through a machine learning algorithm.

In the embodiment as shown in FIG. 8, in a case where the candidate license plate area $M_2$ is a non-license plate area, the detection terminal determines whether the brightness of the candidate license plate area $M_2$ is within a predefined range of brightness. If the brightness is not within the predefined range of brightness, a grey equalization is performed on the candidate license plate area $M_2$. A determination is then made, according to a second predefined classification model, as to whether the grey-equalized candidate license plate area $M_2$ is a license plate area; and if so, the candidate license plate area $M_2$ is determined as a license plate area. A detection result may thus be generated according to the candidate license plate area $M_2$. As such, a candidate license plate $M_2$ containing a real license plate is prevented from being wrongly determined as a non-license plate area due to excessive or insufficient brightness of the candidate license plate area $M_2$. The accuracy of license plate determination is thus improved.

Figure 9:
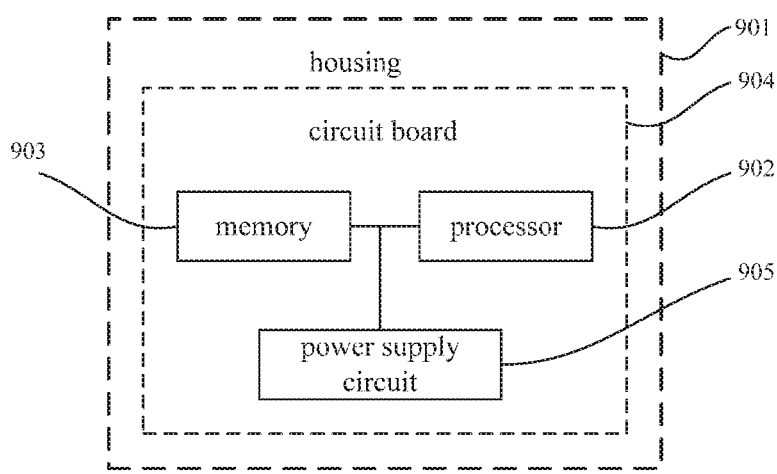
FIG. 9 is a structural schematic diagram of a terminal provided by an embodiment of the present disclosure.

Referring to FIG. 9, illustrating a structural schematic diagram of a terminal provided by an embodiment of the present disclosure. The terminal includes a housing 901, a processor 902, a memory 903, a circuit board 904 and a power supply circuit 905, wherein, the circuit board 904 is placed within the space enclosed by the housing 901; the processor 902 and memory 903 are disposed on the circuit board 1004; the power supply circuit 905 is configured for supplying power to circuits and devices of the terminal; the memory 903 is configured for storing executable program instructions; and the processor 902 is configured for executing the program instructions stored in the memory 903 to perform the following steps:

obtaining, according to pixel values of pixels in an image to be detected, a candidate license plate area $M_1$ in the image to be detected;

calculating an aspect ratio of the candidate license plate area $M_1$ and determining whether the aspect ratio is greater than a first predefined threshold;

if the aspect ratio is greater than the first predefined threshold, determining a new candidate license plate area $M_2$ from the candidate license plate area $M_1$ according to a predefined machine learning-based regression algorithm, wherein the candidate license plate area $M_2$ is an area whose aspect ratio is no greater than the first predefined threshold;

determining, according to a first predefined classification model, whether the candidate license plate area $M_2$ is a license plate area, wherein, the first predefined classification model is a classification model obtained by learning sample license plate areas through a machine learning algorithm;

if the candidate license plate area $M_2$ is a license plate area, determining the candidate license plate area $M_2$ as a license plate area, and generating a detection result based on the candidate license plate area $M_2$.

For the specific process of how the processor 902 performs the steps above and further steps that the processor 902 may perform by running executable program codes, reference can be made to embodiments described with respect to FIGS. 1-8 of the present application, the detail of which is not repeated herein.

In view of above, in embodiments of the present application, a detection terminal may obtain, after receipt of an image to be detected, a candidate license plate area $M_1$ in the image to be detected according to pixel values of pixels in the image to be detected. In a case where the aspect ratio of the candidate license plate area $M_1$ is greater than a first predefined threshold, a new candidate license plate area $M_2$ may be determined from the candidate license plate area $M_1$ according to a predefined machine learning-based regression algorithm. A determination is made, according to a machine learning-based first predefined classification model, as to whether the candidate license plate area $M_2$ is a license plate area. If so, the candidate license plate area $M_2$ is determined as the license plate area and a detection result is generated based on the candidate license plate area $M_2$. As such, a candidate license plate area containing a real license plate may be prevented from being wrongly determined as a non-license plate area due to its excessively large aspect ratio. The accuracy of license plate detection is thus improved. In addition, instead of establishing a classification model by means of manual setting, a first predefined classification model based on machine learning is used to acquire features of a candidate license plate area, so as to classify the candidate license plate area and thereby determine if a candidate license plate area is a license plate area. The accuracy of license plate detection is further improved.

The terminal may take a variety of forms, including but not limited to:

(1) mobile communication devices, featured of an ability of mobile communication and capable of providing voice and data communication. Terminals of this kind may include: smart phone (e.g., iPhone), multi-media phone, functional phone, and low-end phone.

(2) Ultra-mobile personal computer devices. Such devices fall within the category of personal computer, have computation and processing capabilities, and is typically capable of accessing Internet. Terminals of this kind may include devices such as PDA, MID, and UMPC (e.g., iPad).

(3) Portable entertainment device capable of presenting or displaying multi-media contents. Terminals of this kind may include audio/video player (e.g., iPod), handheld game console, Ebook, smart toy and portable in-vehicle navigation device.

(4) Server capable of providing computation services. The server may constitute of a processor, a hard disk, a memory, and a system bus. The server is similar to a general-purpose computer in computational architecture, but may have a higher requirement in aspects such as processing ability, stability, reliability, security, extensibility, and manageability, so as to provide services of high reliability.

(5) Other electronic device capable of data communication.

Embodiments of the present application also provide an executable program, configured for performing, when executed, the method for detecting a license plate as provided in an embodiment of the present application. The method for detecting a license plate includes:

obtaining, according to pixel values of pixels in an image to be detected, a candidate license plate area $M_1$ in the image to be detected;

calculating an aspect ratio of the candidate license plate area $M_1$ and determining whether the aspect ratio is greater than a first predefined threshold;

if the aspect ratio is greater than the first predefined threshold, determining a new candidate license plate area $M_2$ from the candidate license plate area $M_1$ according to a predefined machine learning-based regression algorithm, wherein the candidate license plate area $M_2$ is an area whose aspect ratio is no greater than the first predefined threshold;

determining, according to a first predefined classification model, whether the candidate license plate area $M_2$ is a license plate area, wherein, the first predefined classification model is a classification model obtained by learning sample license plate areas through a machine learning algorithm;

if the candidate license plate area $M_2$ is a license plate area, determining the candidate license plate area $M_2$ as a license plate area, and generating a detection result based on the candidate license plate area $M_2$.

In this embodiment, a detection terminal may obtain, after receipt of an image to be detected, a candidate license plate area $M_1$ in the image to be detected according to pixel values of pixels in the image to be detected. In a case where the aspect ratio of the candidate license plate area $M_1$ is greater than a first predefined threshold, a new candidate license plate area $M_2$ may be determined from the candidate license plate area $M_1$ according to a predefined machine learning-based regression algorithm. A determination is made, according to a machine learning-based first predefined classification model, as to whether the candidate license plate area $M_2$ is a license plate area. If so, the candidate license plate area $M_2$ is determined as the license plate area and a detection result is generated based on the candidate license plate area $M_2$. As such, a candidate license plate area containing a real license plate may be prevented from being wrongly determined as a non-license plate area due to its excessively large aspect ratio. The accuracy of license plate detection is thus improved. In addition, instead of establishing a classification model by means of manual setting, a first predefined classification model based on machine learning is used to acquire features of a candidate license plate area, so as to classify the candidate license plate area and thereby determine if a candidate license plate area is a license plate area. The accuracy of license plate detection is further improved.

Embodiments of the present application also provide a storage medium, configured for storing executable program codes which, when executed, perform the method for detecting a license plate provided by an embodiment of the present application. The method includes:

obtaining, according to pixel values of pixels in an image to be detected, a candidate license plate area $M_1$ in the image to be detected;

calculating an aspect ratio of the candidate license plate area $M_1$ and determining whether the aspect ratio is greater than a first predefined threshold;

if the aspect ratio is greater than the first predefined threshold, determining a new candidate license plate area $M_2$ from the candidate license plate area $M_1$ according to a predefined machine learning-based regression algorithm, wherein the candidate license plate area $M_2$ is an area whose aspect ratio is no greater than the first predefined threshold;

determining, according to a first predefined classification model, whether the candidate license plate area $M_2$ is a license plate area, wherein, the first predefined classification model is a classification model obtained by learning sample license plate areas through a machine learning algorithm;

if the candidate license plate area $M_2$ is a license plate area, determining the candidate license plate area $M_2$ as a license plate area, and generating a detection result based on the candidate license plate area $M_2$.

In this embodiment, a detection terminal may obtain, after receipt of an image to be detected, a candidate license plate area $M_1$ in the image to be detected according to pixel values of pixels in the image to be detected. In a case where the aspect ratio of the candidate license plate area $M_1$ is greater than a first predefined threshold, a new candidate license plate area $M_2$ may be determined from the candidate license plate area $M_1$ according to a predefined machine learning-based regression algorithm. A determination is made, according to a machine learning-based first predefined classification model, as to whether the candidate license plate area $M_2$ is a license plate area. If so, the candidate license plate area $M_2$ is determined as the license plate area and a detection result is generated based on the candidate license plate area $M_2$. As such, a candidate license plate area containing a real license plate may be prevented from being wrongly determined as a non-license plate area due to its excessively large aspect ratio. The accuracy of license plate detection is thus improved. In addition, instead of establishing a classification model by means of manual setting, a first predefined classification model based on machine learning is used to acquire features of a candidate license plate area, so as to classify the candidate license plate area and thereby determine if a candidate license plate area is a license plate area. The accuracy of license plate detection is further improved.

Embodiments of the apparatus, terminal, executable program, and storage medium are merely described in brief in view of their resemblance with the method embodiments. Relevant parts may be understood with reference to the method embodiments.

It should be noted that in the claims and the specification, relationship terms such as "first", "second" and the like are only used to distinguish one entity or operation from another entity or operation, and do not necessarily require or imply that there is any such actual relationship or order between those entities or operations. Moreover, the terms "comprise" "include" or any other variants are intended to cover a non-exclusive inclusion, such that processes, methods, objects or devices including a series of elements include not only those elements, but also other elements not specified or the elements inherent to those processes, methods, objects or devices. Without further limitations, elements limited by the phrase "include(s) a . . . " do not exclude that there are other identical elements in the processes, methods, objects or devices that include that element.

Those of ordinary skill in the art can appreciate that all or a part of the embodiments described above can be implemented by instructing relevant hardware through a program. The program can be stored in a computer readable storage medium such as a ROM/RAM, magnetic disk, and optic disk.

What has been described above are merely preferred embodiments of the present application, and are not used to limit the scope of protection of the present application. Any modification, equivalent replacement or improvement made within the spirit and principle of the present application falls within the scope of protection of the present application.

What is claimed is:

1. A method for detecting a license plate, comprising:
   obtaining, according to pixel values of pixels in an image to be detected, a candidate license plate area $M_1$ in the image to be detected;
   calculating an aspect ratio of the candidate license plate area $M_1$ and determining whether the aspect ratio is greater than a first predefined threshold;
   if the aspect ratio is greater than the first predefined threshold, determining a new candidate license plate area $M_2$ from the candidate license plate area $M_1$ according to a predefined machine learning-based regression algorithm, wherein the candidate license plate area $M_2$ is an area whose aspect ratio is no greater than the first predefined threshold;
   determining, according to a first predefined classification model, whether the candidate license plate area $M_2$ is a license plate area, wherein, the first predefined classification model is a classification model obtained by learning sample license plate areas through a machine learning algorithm, and wherein, in constructing of the first classification model, a lame amount of sample license plate areas previously found are learned through the machine learning algorithm so as to obtain a classification model, by means of which an area of the candidate license plate area is classified into a license plate area and non-license plate area;
   if the candidate license plate area $M_2$ is a license plate area, determining the candidate license plate area $M_2$ as a license plate area, and generating a detection result based on the candidate license plate area $M_2$,
   wherein, determining a new candidate license plate area $M_2$ from the candidate license plate area $M_1$ according to a predefined machine learning-based regression algorithm comprises:
   determining a position of a suspected character string in the candidate license plate area $M_1$;
   determining, through the predefined machine learning-based regression algorithm, a new boundary of the candidate license plate area according to the determined position; and
   obtaining the candidate license plate area $M_2$ according to the new boundary.

2. The method of claim 1, wherein, obtaining, according to pixel values of pixels in an image to be detected, a candidate license plate area $M_1$ in the image to be detected comprises:

obtaining a valid pixel segment in each pixel row of the image to be detected in a predefined scan order, wherein, the valid pixel segment is a pixel segment that is determined according to pixels having a greyscale jump value greater than a second predefined threshold in a pixel row;

calculating a boundary similarity for vertically adjacent valid pixel segments, according to pixel values of pixels at both ends of each valid pixel segment and pixel values of pixels at both ends of another valid pixel segment vertically adjacent to that valid pixel segment;

merging adjacent valid pixel segments which have a boundary similarity greater than a third predefined threshold; and obtaining the candidate license plate area $M_1$ in the image to be detected according to the merged valid pixel segments.

3. The method of claim 2, wherein, obtaining a valid pixel segment in each pixel row of the image to be detected in a predefined scan order comprises:

obtaining a valid pixel segment in each pixel row of the image to be detected in a predefined scan order by:

calculating a greyscale jump value of each pixel in a pixel row X, wherein the pixel row X is any pixel row in the image to be detected;

selecting pixels having a greyscale value greater than the second predefined threshold;

obtaining a candidate pixel segment in the pixel row X according to a pixel having a maximum horizonal coordinate and a pixel having a minimum horizonal coordinate among the selected pixels;

determining whether greyscale jump values of pixels in the candidate pixel segment conform to a predefined greyscale jumping rule; and if so, determining the candidate pixel segment as a valid pixel segment.

4. The method of claim 2, wherein, obtaining the candidate license plate area $M_1$ in the image to be detected according to the merged valid pixel segments comprises:

determining a suspected character string area in the merged valid pixel segments;

obtaining color information of character string according to a pixel value of a pixel in the suspected character string area, and obtaining color information of background according to a pixel value of a pixel not in the non-suspected character string area in the merged valid pixel segments;

determining boundary of the candidate license plate $M_1$ according to the color information of character string and the color information of background; and obtaining the candidate license plate area $M_1$ according to the determined boundary.

5. The method of claim 1, further comprising:

determining, in response to a determination that the candidate license plate area $M_2$ is not a license plate area, whether brightness of the candidate license plate area $M_2$ is within a predefined range of brightness;

performing, if the brightness of the license plate candidate area $M_2$ is not within a predefined range of brightness, grey equalization on the candidate license plate area $M_2$;

determining whether the grey-equalized candidate license plate area $M_2$ is a license plate area according to a second predefined classification model, wherein, the second predefined classification model is a classification model obtained by learning grey-equalized sample license plate areas through a machine learning algorithm;

performing, if the candidate license plate area $M_2$ is a license plate area, the steps of determining the candidate license plate area $M_2$ as a license plate area and generating a detection result based on the candidate license plate area $M_2$.

6. A non-transitory computer-readable storage medium, which is used for storing executable program codes, wherein the executable program codes is configured for, when being executed, implement the method for detecting a license plate according to claim 1.

7. A terminal, comprising: a housing, a processor, a memory, a circuit board and a power supply circuit, wherein, the circuit board is arranged within a space enclosed by the housing; the processor and memory are disposed on the circuit board; the power supply circuit is configured for supplying power to circuits and devices of the terminal; the memory is configured for storing executable program instructions; and the processor is configured for executing the executable program instructions stored in the memory to perform:

obtaining, according to pixel values of pixels in an image to be detected, a candidate license plate area $M_1$ in the image to be detected;

calculating an aspect ratio of the candidate license plate area $M_1$ and determining whether the aspect ratio is greater than a first predefined threshold;

if the aspect ratio is greater than the first predefined threshold, determining a new candidate license plate area $M_2$ from the candidate license plate area $M_1$ according to a predefined machine learning-based regression algorithm, wherein the candidate license plate area $M_2$ is an area whose aspect ratio is no greater than the first predefined threshold;

determining, according to a first predefined classification model, whether the candidate license plate area $M_2$ is a license plate area, wherein, the first predefined classification model is a classification model obtained by learning sample license plate areas through a machine learning algorithm, and wherein, in constructing of the first classification model, a lame amount of sample license plate areas previously found are learned through the machine learning algorithm so as to obtain a classification model, by means of which an area of the candidate license plate area is classified into a license plate area and non-license plate area;

if the candidate license plate area $M_2$ is a license plate area, determining the candidate license plate area $M_2$ as a license plate area, and generating a detection result based on the candidate license plate area $M_2$, wherein, determining a new candidate license plate area $M_2$ from the candidate license plate area $M_1$ according to a predefined machine learning-based regression algorithm comprises:

determining a position of a suspected character string in the candidate license plate area $M_1$;

determining, through the predefined machine learning-based regression algorithm, a new boundary of the candidate license plate area according to the determined position; and obtaining the candidate license plate area $M_2$ according to the new boundary.

8. The terminal of claim 7, wherein, obtaining, according to pixel values of pixels in an image to be detected, a candidate license plate area $M_1$ in the image to be detected comprises:

obtaining a valid pixel segment in each pixel row of the image to be detected in a predefined scan order, wherein, the valid pixel segment is a pixel segment that is determined according to pixels having a greyscale jump value greater than a second predefined threshold in a pixel row;

calculating a boundary similarity for vertically adjacent valid pixel segments, according to pixel values of pixels at both ends of each valid pixel segment and pixel values of pixels at both ends of another valid pixel segment vertically adjacent to that valid pixel segment;

merging adjacent valid pixel segments which have a boundary similarity greater than a third predefined threshold; and obtaining the candidate license plate area $M_1$ in the image to be detected according to the merged valid pixel segments.

9. The terminal of claim 8, wherein, obtaining a valid pixel segment in each pixel row of the image to be detected in a predefined scan order comprises:

obtaining a valid pixel segment in each pixel row of the image to be detected in a predefined scan order by:

calculating a greyscale jump value of each pixel in a pixel row X, wherein the pixel row X is any pixel row in the image to be detected;

selecting pixels having a greyscale value greater than the second predefined threshold;

obtaining a candidate pixel segment in the pixel row X according to a pixel having a maximum horizontal coordinate and a pixel having a minimum horizontal coordinate among the selected pixels;

determining whether greyscale jump values of pixels in the candidate pixel segment conform to a predefined greyscale jumping rule; and if so, determining the candidate pixel segment as a valid pixel segment.

10. The terminal of claim 8, wherein, obtaining the candidate license plate area $M_1$ in the image to be detected according to the merged valid pixel segments comprises:

determining a suspected character string area in the merged valid pixel segments;

obtaining color information of character string according to a pixel value of a pixel in the suspected character string area, and obtaining color information of background according to a pixel value of a pixel not in the non-suspected character string area in the merged valid pixel segments;

determining boundary of the candidate license plate $M_1$ according to the color information of character string and the color information of background; and obtaining the candidate license plate area $M_1$ according to the determined boundary.

11. The terminal of claim 7, wherein, determining a new candidate license plate area $M_2$ from the candidate license plate area $M_1$ according to a predefined machine learning-based regression algorithm comprises:

determining a position of a suspected character string in the candidate license plate area $M_1$;

determining, through the predefined machine learning-based regression algorithm, a new boundary of the candidate license plate area according to the determined position; and obtaining the candidate license plate area $M_2$ according to the new boundary.

12. The terminal of claim 7, the processor is further configured for executing the executable program instructions stored in the memory to perform:

determining, in response to a determination that the candidate license plate area $M_2$ is not a license plate area, whether brightness of the candidate license plate area $M_2$ is within a predefined range of brightness;

performing, if the brightness of the license plate candidate area $M_2$ is not within a predefined range of brightness, grey equalization on the candidate license plate area $M_2$;

determining whether the grey-equalized candidate license plate area $M_2$ is a license plate area according to a second predefined classification model, wherein, the second predefined classification model is a classification model obtained by learning grey-equalized sample license plate areas through a machine learning algorithm;

performing, if the candidate license plate area $M_2$ is a license plate area, the steps of determining the candidate license plate area $M_2$ as a license plate area and generating a detection result based on the candidate license plate area $M_2$.

* * * * *